United States Patent
Cheng et al.

(10) Patent No.: US 10,317,894 B2
(45) Date of Patent: Jun. 11, 2019

(54) NO FLOW DETECTION MEANS FOR SENSORLESS PUMPING CONTROL APPLICATIONS

(71) Applicant: Fluid Handling LLC., Morton Grove, IL (US)

(72) Inventors: Andrew A. Cheng, Wilmette, IL (US); James J. Gu, Buffalo Grove, IL (US)

(73) Assignee: Fluid Handling LLC, Morton Grove, IL (US)

( * ) Notice: Subject to any disclaimer, the term of this patent is extended or adjusted under 35 U.S.C. 154(b) by 203 days.

(21) Appl. No.: 15/044,670

(22) Filed: Feb. 16, 2016

(65) Prior Publication Data

US 2016/0246290 A1      Aug. 25, 2016

Related U.S. Application Data

(60) Provisional application No. 62/116,031, filed on Feb. 13, 2015.

(51) Int. Cl.
| | |
|---|---|
| *G05B 19/406* | (2006.01) |
| *G05B 19/46* | (2006.01) |
| *F04D 15/02* | (2006.01) |

(52) U.S. Cl.
CPC ......... *G05B 19/46* (2013.01); *F04D 15/0209* (2013.01); *F04D 15/0245* (2013.01)

(58) Field of Classification Search
CPC ...... F04D 13/06; F04D 15/0236; F04D 13/00; F04D 15/02; F04D 27/001; F04D 27/004;
(Continued)

(56) References Cited

U.S. PATENT DOCUMENTS 5,505,182 A * 4/1996 Denz ................ F02M 25/0809
                                                            123/198 D
6,625,519 B2   9/2003 Goodwin et al.
(Continued)

FOREIGN PATENT DOCUMENTS

| WO | 2007072033 | 6/2007 |
|---|---|---|
| WO | 2014149388 | 9/2014 |
| WO | 2015080757 | 6/2015 |

OTHER PUBLICATIONS

Vastyan, John, "Variable-Speed Pumping—Changing flow and maintaining it smartly, exactly as dictated by demand," HPAC Engineering, Dec. 2012, http://www.taco-hvac.com/images/Vastyan-revised.pdf, pp. 2-7.
(Continued)

*Primary Examiner* — Darrin D Dunn
(74) *Attorney, Agent, or Firm* — Ware, Fressola, Maguire & Barber LLP (57) ABSTRACT

Apparatus is provided featuring a signal processor or processing module configured to receive signaling containing information about a pump no flow idle (NFI) state when the pump is running at a pump idle speed; and determine corresponding signaling containing information about whether the pump should remain in a no flow shutdown (NFSD) state or the pump NFI state, based upon the signaling received. The signal processor or processing module is configured to provide the corresponding signaling containing information about whether the pump should remain in the NFSD state or the NFI state.

12 Claims, 3 Drawing Sheets

A sensorless converter to provide instant pump differential pressure and flow rate based on running motor power and speed values.

(58) Field of Classification Search
CPC .......... F04B 49/10; F04B 49/20; G05B 15/02; G05B 2219/37371; F04C 14/00; F04C 14/08
See application file for complete search history.

(56) References Cited

U.S. PATENT DOCUMENTS

| | | | |
|---|---|---|---|
| 7,021,409 | B2 | 4/2006 | Tamor |
| 7,089,088 | B2 | 8/2006 | Terry et al. |
| 7,286,906 | B2 | 10/2007 | Richards |
| 7,668,694 | B2 | 2/2010 | Anderson et al. |
| 7,941,294 | B2 | 5/2011 | Shahi et al. |
| 7,945,411 | B2 | 5/2011 | Kernan et al. |
| 7,967,572 | B2 | 6/2011 | Ishikawa et al. |
| 8,174,222 | B2 | 5/2012 | Patel et al. |
| 8,378,605 | B2 | 2/2013 | Wang et al. |
| 8,506,470 | B2 | 8/2013 | LaRose et al. |
| 8,641,385 | B2 | 2/2014 | Koehl |
| 8,700,221 | B2 | 4/2014 | Cheng et al. |
| 8,710,788 | B2 | 4/2014 | Hano et al. |
| 8,753,256 | B2 | 6/2014 | Bolyard et al. |
| 8,774,972 | B2 | 7/2014 | Rusnak et al. |
| 8,820,404 | B2 | 9/2014 | Lisk |
| 8,827,656 | B2 | 9/2014 | Sano et al. |
| 8,932,026 | B2 | 1/2015 | Akita |
| 2004/0152944 | A1 | 8/2004 | Medvedev et al. |
| 2005/0004421 | A1 | 1/2005 | Pacella et al. |
| 2005/0159639 | A1 | 7/2005 | Skliar et al. |
| 2007/0160480 | A1* | 7/2007 | Ruffo ................. F04D 15/0066 417/44.2 |
| 2007/0163929 | A1 | 7/2007 | Stiles, Jr. et al. |
| 2007/0212229 | A1* | 9/2007 | Stavale .............. F04D 15/0088 417/42 |
| 2008/0063535 | A1* | 3/2008 | Koehl ................ F04D 15/0088 417/18 |
| 2010/0174460 | A1 | 7/2010 | Gibson et al. |
| 2013/0129536 | A1 | 5/2013 | Robol et al. |
| 2013/0164146 | A1 | 6/2013 | Ahola et al. |
| 2014/0005841 | A1 | 1/2014 | Cheng et al. |
| 2014/0112801 | A1 | 4/2014 | Kozaki |
| 2014/0135999 | A1 | 5/2014 | Stavale |
| 2014/0288716 | A1* | 9/2014 | Cheng ................ F04D 15/0088 700/282 |
| 2014/0294601 | A1 | 10/2014 | O'Shea et al. |
| 2014/0332199 | A1 | 11/2014 | Gilstad et al. |
| 2014/0371913 | A1 | 12/2014 | Zeltzer |
| 2015/0032271 | A1 | 1/2015 | Cheng et al. |
| 2015/0037169 | A1 | 2/2015 | Veltman et al. |

OTHER PUBLICATIONS

"Water Circulation Pumps & Circulators—Viridian Circulators," Dec. 1, 2011, http://www.emersonswan.com/ckfinder/userfiles/files/pop111.pdf (4 pages).

Taaning-Grundholm, Frank, "Making Sense of Sensorless," Empowering Pumps, May 19, 2014, http://empoweringpumps.com/making-sense-sensorless/ (7 pages).

Beca, John, "ITT PumpSmart® Eliminates Need for Flow Meter," Goulds Pumps, May 1, 2009, p. 2/3 http://www.gouldspumps.com/News/ITT-PumpSmart/oC2/oAE-Eliminates-Need-for-Flow-Meter.

"Sensorless Flow Meas. & Pump Protection," Flow Control, Nov. 15, 2012 http://www.flowcontrolnetwork.com/articles/89975-sensorless-flow-meas-pump-protection (2 pages).

Fu, Minghua and Xu, Longya, "Computer Simulation of Sensorless Fuzzy Control of a Rotary Blood Pump to Assure Normal Physiology," ASAIO Journal, May/Jun. 2000, vol. 46, issue 3, pp. 273-278 http://journals.lww.com/asaiojournal/Abstract/2000/05000/computer_Simulation_of_Sensorless_Fuzzy_Control_of.6.aspx.

* cited by examiner

Figure 1. A sensorless converter to provide instant pump differential pressure and flow rate based on running motor power and speed values.

Apparatus 10

Signal processor or processing module 10a configured at least to:

receive signaling containing information about a pump no flow idle state (NFI) when a pump is running at a pump idle speed;

determine whether the pump should remain in a no flow shutdown (NFSD) state or the NFI state, based upon the signaling received; and/or provide corresponding signaling containing information about whether the pump should remain in the NFSD state or the NFI state.

Other signal processor circuits or components 10b that do not form part of the underlying invention, e.g., including input/output modules, one or more memory modules, data, address and control busing architecture, etc.

Figure 2

Fig 3 Terminologies and curves for no flow detection criterions and schemes for a sensorless pumping control Fig. 4A: Pump differential pressure (ft) vs. flow rate (GPM)

Fig. 4B: Pump power (hp) vs. flow rate (GPM)

Fig. 4. Pump differential pressure and power vs. flow rate measured at a pump idle speed of 15, 20, 25 and 30 Hz respectively.

NO FLOW DETECTION MEANS FOR SENSORLESS PUMPING CONTROL APPLICATIONS

CROSS REFERENCE TO RELATED APPLICATION

This application claims benefit to U.S. provisional application No. 62/116,031, filed 13 Feb. 2015, entitled "No flow detection means for sensorless pumping control applications," which is hereby incorporated by reference in its entirety.

The present invention builds on the family of technologies disclosed in the other related applications identified below.

BACKGROUND OF THE INVENTION

1. Field of the Invention

The present invention relates to a technique for controlling pumping applications; and more particularly, the present invention relates to a method and apparatus for determining when there is no flow request in a pumping system using motor operation parameters, such as power current and torque, and controlling the controlling pumping applications based upon the determination.

2. Brief Description of Related Art

Figure 1:
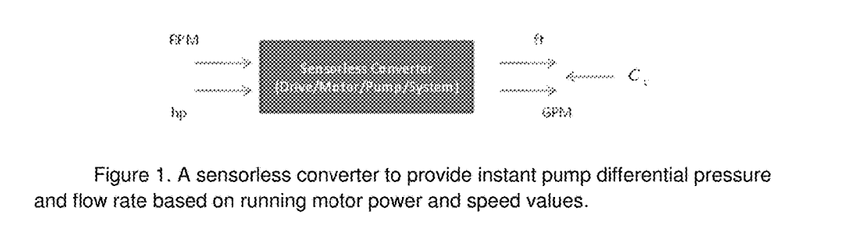
FIG. 1 is a schematic diagram of a known sensorless converter to provide instant pump differential pressure and flow rate based upon running motor power and speed value, according to some embodiments of the present invention.

Recently, variable speed pump controls with energy saving and sensorless control means are known for hydronic pumping control applications, e.g., as disclosed in the patent applications set forth herein as references labeled [1] to [7] below. A sensorless converter, as shown schematically in FIG. 1, yields system pressure (ft) and flow rate values (GPM) providing motor power (current, or torque) and speed values, e.g., as disclosed in the patent applications set forth herein as references labeled [3-7] below. As one skilled in the art would appreciate, the sensorless converter would effectively be "senseless" without running the motor and obtaining motor values (e.g., RPM and hp) as input signals ready to be converted from otherwise. There would be no other pressure or flow value but zero which can be converted if the motor shuts off. No flow detection based upon the system pressure drop from the pump minimum pressure by a conventional no flow shutdown (NFSD) detection scheme is, therefore, unachievable, provided no additional no flow conditions or pump running states are introduced.

There is a need in the pump industry for a better way to determine no flow detection for sensorless pumping control applications.

SUMMARY OF THE INVENTION

In summary, the present invention provides a new and unique no flow detection means or techniques using detection conditions and pump operations schemes specifically for sensorless pumping control applications to save pump operation energy when there is no flow request in the pumping system. With the conventional NFSD principle, e.g., consistent with that set forth above, the introduction of a no flow idle speed detection scheme makes for no flow pumping operations, including no flow shutdown as well as no flow idle detection, feasible for sensorless pumping control applications. According to the present invention, primary control parameters for no flow detection conditions may include not only pump hydronic parameters, such as flow, pressure, or system positions (or coefficients), but also may include motor operation parameters, such as power, current, or torque, respectively. Moreover, according to the present invention, several alternative schemes with the combination of the sensorless and an external flow or pressure signal are introduced as well, e.g., by using a flow switch, zone flow signals or a pressure sensor as set forth herein.

Specific Embodiments

By way of example, the present invention provides a new and unique technique for sensorless pumping control application.

According to some embodiments, the present invention may include, or take the form of, a method or apparatus, e.g., in a hydronic pumping control applications or systems, featuring a signal processor or signal processing module, configured to:

receive signaling containing information about a pump no flow idle (NFI) state when the pump is running at a pump idle speed; and determine corresponding signaling containing information about whether the pump should remain in a no flow shutdown (NFSD) state or the NFI state, based upon the signaling received.

According to some embodiments, the present invention may include one or more of the following features:

The signal processor or processing module may be configured to provide the corresponding signaling containing information about whether the pump should remain in the NFSD state or the NFI state.

The signal processor or processing module may be configured to determine the corresponding signaling by taking a system flow Q* at a pump idle speed $n_{idle}$ as a no flow detection primary parameter under a no flow condition, using an equation:

$$0 \leq Q^* \leq Q_{thr}, t \geq T_p, \qquad (3.1)$$

where a flow threshold is defined as $Q_{thr}$ for a period of prove time of $T_P$.

The signal processor or processing module may be configured to determine if the system flow Q* requested at the pump idle speed is less than the flow threshold $Q_{thr}$ for the period of prove time of $T_P$, and determine that if an NFSD condition is met and control may remain in the NFSD state or the NFI state, by following NFSD/NSI schemes and a NFSD flag remains raised; or otherwise, turn the pump back to its normal operation if flow is detected in system, based upon the Equation: $Q_{thr} \leq Q^*$ with $t \geq T_P$.

The signal processor or processing module may be configured to determine the corresponding signaling by taking system pressure P* at a pump idle speed $n_{idle}$ as a no flow detection parameter under the no flow condition, using an Equation:

$$(H_0 - db) \leq P^* \leq H_0, t \geq T_p, \qquad (3.2)$$

where $H_0$ is the idle pressure, $(H_0-db)$ is a pressure drop from the idle pressure, and $T_P$, is the period of prove time.

The signal processor or processing module may be configured to determine if the system pressure P* at the idle speed is less than the idle pressure $H_0$ and greater than the pressure drop $(H_0-db)$ from the idle pressure for the period of prove time of $T_P$, and determine if an NFSD condition is met and control may remain in the NFSD state or the NFI state, by following NFSD/NSI schemes and an NFSD flag remain raised; or otherwise, turn pump back to its normal operation if flow is detected in system under the flow condition, based upon the Equation: $P^* \leq (H_0-db)$ with $t \geq T_P$.

The signal processor or processing module may be configured to determine the corresponding signaling by taking an instant system coefficient $C_V$ at the pump idle speed of $n_{idle}$ as a no flow detection parameter as well under the no flow condition, using an Equation:

$$0 \leq C^*_v \leq C_{v\text{-}thr}, t \geq T_p, \quad (3.3)$$

where $C_{v\text{-}thr}$ is a system coefficient threshold, and $T_P$ a period of prove time.

The signal processor or processing module may be configured to determine if the instant system coefficient $C_V$ at the minimum speed is vanished or less than the system coefficient threshold of $C_{v\text{-}thr}$ for the period of prove time of $T_P$, and determine if an NFSD condition is met and an NFSD flag is then raised accordingly; or otherwise, turn the pump back to its normal operation if flow is detected in system under the flow condition, using an Equation: $C_{v\text{-}thr} \leq C^*_v$ with $t \geq T_p$.

The signal processor or processing module may be configured to determine the corresponding signaling by taking motor power w* at the pump idle speed of $n_{idle}$ as a no flow detection parameter as well under the no flow condition, using an Equation:

$$0 \leq x^* \leq w_{thr}, t \geq T_p, \quad (3.4)$$

where w* is the motor power, $w_{thr}$ is a power threshold of $w_{thr}$, and $T_P$ is a period of prove time.

The signal processor or processing module may be configured to determine if the motor power w* at the idle speed is less than the power threshold $w_{thr}$ for the period of prove time $T_P$, and determine if an NFSD condition is met and a NFSD flag is then raised accordingly; or otherwise, turn pump back to its normal operation if flow is detected in system under the flow condition, based upon an Equation: $w_{thr} \leq w^*$ with $t \geq T_p$.

The corresponding signaling may be used as control signaling in a pumping hydronic control system in a dynamic hydronic pumping system.

By way of example, the signal processor or processing module may include, or take the form of, at least one signal processor and at least one memory including computer program code, and the at least one memory and computer program code are configured to, with at least one signal processor, to cause the signal processor at least to receive the signaling (or, for example, the associated signaling) and determine the corresponding signaling, based upon the signaling received. The signal processor or processing module may be configured with suitable computer program code in order to implement suitable signal processing algorithms and/or functionality, consistent with that set forth herein.

According to some embodiments, the present invention may also take the form of a method including steps for:
receiving in a signal processor or processing module signaling containing information about a pump no flow idle state (NFI) when the pump is running at a pump idle speed; and
determining in the signal processor or processing module corresponding signaling containing information about whether the pump should remain in a no flow shutdown (NFSD) state or the NFI state, based upon the signaling received.

The method may also include one or more of the features set forth herein, including providing from the signal processor or processing module corresponding signaling containing information about whether the pump should remain in the NFSD state or the NFI state, e.g., which may be used to control the valve in the a dynamic hydronic pumping system.

The present invention may also, e. g., take the form of a computer program product having a computer readable medium with a computer executable code embedded therein for implementing the method, e.g., when run on a signal processing device that forms part of such a pump or valve controller. By way of example, the computer program product may, e. g., take the form of a CD, a floppy disk, a memory stick, a memory card, as well as other types or kind of memory devices that may store such a computer executable code on such a computer readable medium either now known or later developed in the future.

The instant application provides a new technique that is a further development of, and builds upon, the aforementioned family of technologies set forth herein.

BRIEF DESCRIPTION OF THE DRAWING

The drawing includes the following Figures, which are not necessarily drawn to scale:

FIG. 4 includes FIGS. 4A and 4B showing graphs of pump differential pressure and power vs. flow rate measured at a pump idle speed of 15, 20, 25 and 30 Hz respectively, where

DETAILED DESCRIPTION OF THE INVENTION

Figure 2:
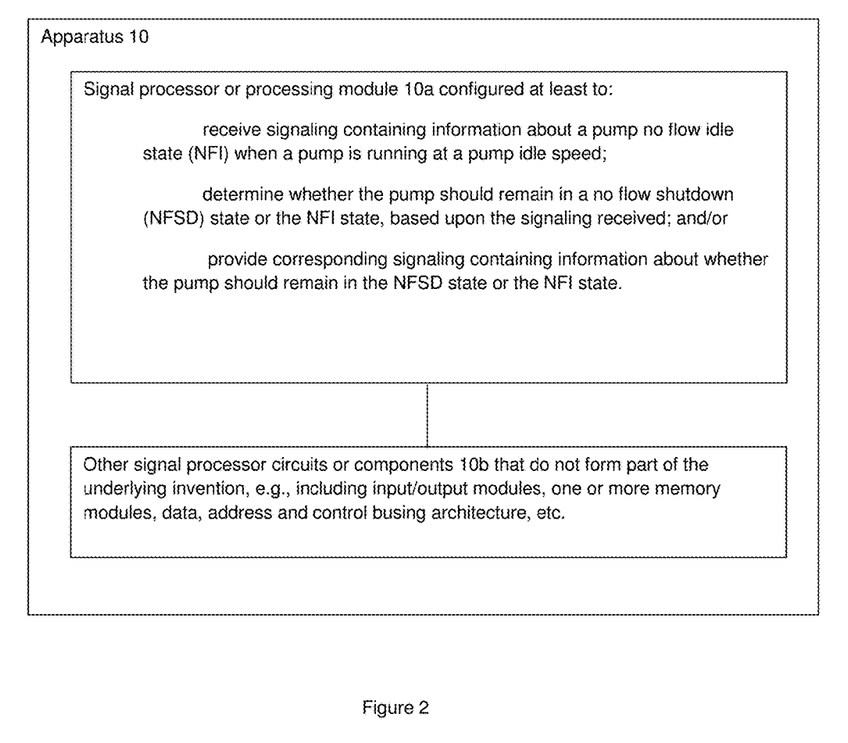
FIG. 2 is a block diagram of apparatus, e.g., having a signal processor or processing module, configured for implementing the signal processing functionality, according to some embodiments of the present invention.

FIG. 2: Implementation of Signal Processing Functionality

By way of example, FIG. 2 shows apparatus 10 according to some embodiments of the present invention, e.g., featuring a signal processor or processing module 10a configured at least to:
receive signaling containing information about a pump no flow idle state (NFI) when the pump is running at a pump idle speed; and
determine corresponding signaling containing information about whether the pump should remain in a no flow shutdown (NFSD) state or the NFI state, based upon the signaling received.

In operation, the signal processor or processing module may be configured to provide corresponding signaling containing information about whether the pump should remain in the NFSD state or the NFI state. The corresponding signaling may contain information used to control a pumping hydronic system.

The signal processor or processing module 10a may be configured in, or form part of, a pump and/or a pump control, e.g., which may include or be implemented in conjunction with a pump control or controller configured therein. By way of example, embodiments are envisioned in which the apparatus is a pump having the signal processor or processing module 10a, and embodiments are envisioned in which the apparatus is a pump control or controller having the signal processor or processing module 10a.

As a person skilled in the art would appreciate and understand, the present invention may be implemented using system characteristics and associated equations, e.g., consistent with that set forth herein, as well as by using other types or kinds of system characteristics and associated equations that are either now known or later developed in the future.

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element 10a. A person skilled in the art would be able to program with suitable program code such a microcontroller-based, or microprocessor-based, implementation to perform the functionality described herein without undue experimentation. For example, the signal processor or processing module 10a may be configured, e.g., by a person skilled in the art without undue experimentation, to receive the signaling containing information about the pump no flow idle state (NFI) when the pump is running at a pump idle speed, consistent with that disclosed herein.

Moreover, the signal processor or processing module 10a may be configured, e.g., by a person skilled in the art without undue experimentation, to determine the corresponding signaling containing information about whether the pump should remain in the NFSD state or the NFI state, consistent with that disclosed herein.

The scope of the invention is not intended to be limited to any particular implementation using technology either now known or later developed in the future. The scope of the invention is intended to include implementing the functionality of the processors 10a as stand-alone processor, signal processor, or signal processor module, as well as separate processor or processor modules, as well as some combination thereof.

The apparatus 10 may also include, e.g., other signal processor circuits or components 10b, including random access memory or memory module (RAM) and/or read only memory (ROM), input/output devices and control, and data and address buses connecting the same, and/or at least one input processor and at least one output processor, e.g., which would be appreciate by a person skilled in the art.

Figure 3:
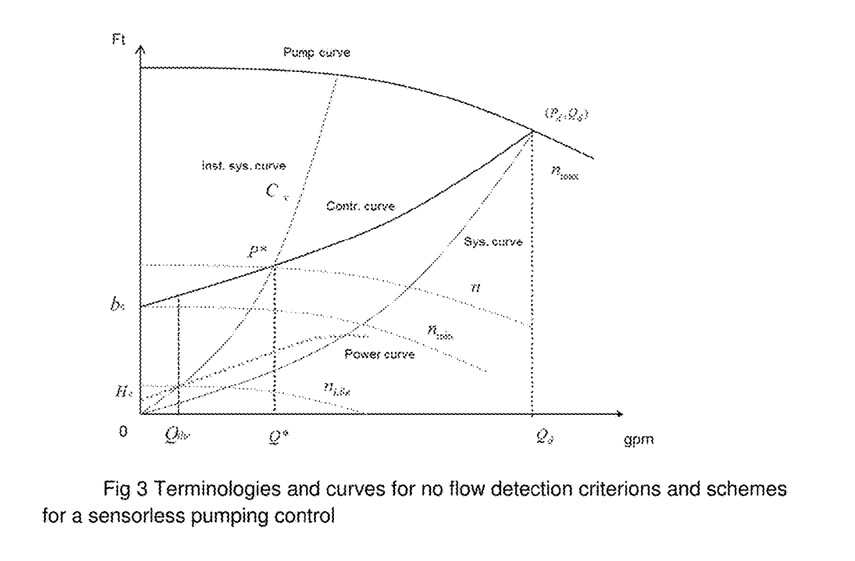
FIG. 3 is a graph showing terminologies and curves for no flow detection criterion and schemes for a sensorless pumping control, according to implementations of some embodiments of the present invention.
Figure 4A:
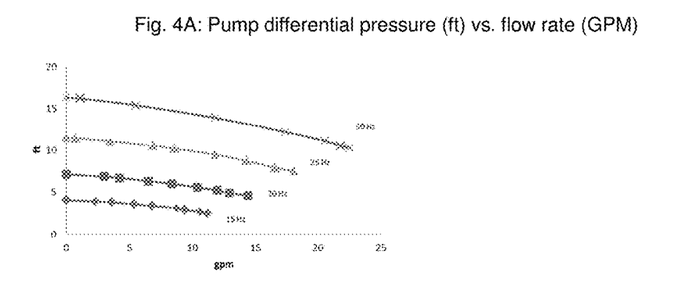
FIG. 4A is a graph of pump differential pressure (ft) vs. flow rate (GPM), and where
Figure 4B:
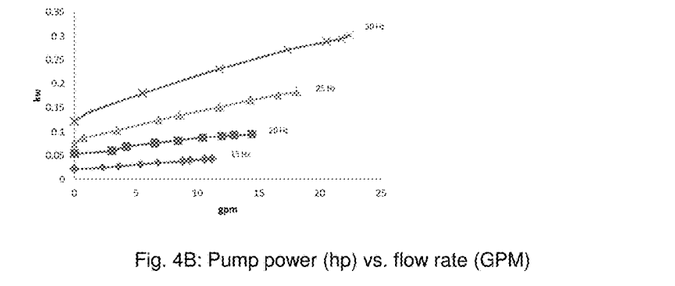
FIG. 4B is a graph of pump power (hp) vs. flow rate (GPM).

FIGS. 3-4: Details of Implementation

Introduction

One feasible scheme for no flow detection for a sensorless pumping control application may be implemented by having the motor running first and running at a reasonable low speed while carrying out no flow detection. This low speed pump running state introduced particularly for the no flow detection for sensorless control applications may be called as a pump NFI state. The speed associated with the pump NFI state may be named or referred to as the pump idle speed accordingly. The present invention of a no flow detector means for sensorless pumping control may include a no flow detector with its no flow detection conditions and pump operations schemes as disclosed herein for sensorless pumping control applications to save pump operation energy when there is no flow request in system. Together with the NFSD conditions and operations at the pump minimum speed in the pump normal operation state, the introduction of the pump NFI with the additional no flow detection conditions at the pump idle speed makes no flow shutdown pump operation feasible specifically for sensorless pumping control.

For close-loop heating and cooling applications, it may be feasible to define a pump off sleeping time to turn ON/OFF pump into the NFI state and carry out flow or no flow detection accordingly, since there may be the traceable period of time for water temperature changes to the certain degree. For an open-loop booster system, however, an immediate response to flow in system may be needed. For that, according to some embodiments, an external flow or pressure signal may be needed for practical sensorless NFSD applications as well. Several alternative schemes with the combination of the sensorless and an external flow or pressure signal by using a flow switch, zone flow signals or a pressure sensor are introduced accordingly.

No Flow Shutdown Criterions and Schemes for Sensorless Control

FIG. 3 shows a control curve (contr. curve) defined as a pump pressure set point curve for pump pressure control; shows an instantaneous system curve $C_v$ plotted based upon equivalent system characteristics curve at any instant time defined by system flow equation, including the system curve designed conventionally at pump maximum speed; and shows a pump curve (Pump curve) as a characteristics curve of pump differential pressure verses flow rate at a speed, say, an instant speed of n, maximum speed of $n_{max}$ and minimum speed of $n_{min}$, respectively. By way of example, in this patent application a pump state at an idle speed of $n_{idle}$, and a very low motor speed around 5-15 Hz, may be introduced as a pump idle operation state, under which no flow detection for a sensorless control may be achievable. The power values vs. flow rate associated with a pump curve is call and plotted as a corresponding power curve.

For no flow detection, some parameters, such as pressures and flow rates as well as their corresponding thresholds have been defined and shown in FIG. 3, where the parameter Q* is a flow rate requested by system and the parameter P* is a pressure set point corresponding to requested flow rate at the requested flow rate Q*. They may be obtained from the sensorless converter or calculated as the requested flow rate by adaptive method as well that disclosed in references labeled [1] to [7] below. The system flow rate, Q*, may be selected preferably for a primary no flow detection parameter, since the flow signal can be obtained directly from the sensorless converter. The corresponding thresholds, $Q_{thr}$, may then be introduced for a no flow detection condition.

If the pressure is selected as a primary control parameter and exactly the same as a conventional NFSD, a system pressure drop, db, from the minimum pressure, $b_0$, may be used to detect no flow in system at pump minimum speed in pump normal operation state. An idle pressure, $H_0$, may be introduced as well for no flow detection in system in the pump NFI state specifically for sensorless applications. Again, the pressure drop from the idle pressure may be used as the no flow detection condition.

In addition, the motor's power, current or torque readouts of w*, A* and T* from a drive may be used also as one or more control parameters for no flow detection. Based upon the terms and parameters defined herein, no flow detection criterions and schemes may be detailed as follows.

1) No Flow Shutdown and/or No Flow Idle Schemes

No flow detection may be carried out continuously at the motor's minimum speed in the pump's normal operation state. If a no flow in system condition is detected, then the pump may then be forced into either a NFSD state or NFI state. In whichever states under no flow condition, the control or controller has to bring the pump back into its idle state and carry out flow or no flow detection at its idle speed accordingly as pointed out set forth. The pump may then be sped back up to its normal operation if flow is detected in system. It may remain in the NFI state or go back into the NFSD state, otherwise. Several flow or no flow detections and pump operations schemes may be utilized and detailed accordingly next.

1.1) No Flow Shutdown/Idle Detection Scheme

First, no flow detection may be implemented or carried out continuously at minimum speed in the pump's normal operation state. If a no flow in system condition is detected by the detector, then the pump may then be forced into the NFSD state. After shut off for a period of time defined as the pump off sleeping time of $T_s$ in the NFSD state, the control or controller may turn or switch pump into the NFI state and carry out flow or no flow detection accordingly. If a flow in system condition is detected, the pump may then be sped up back to its normal operation. Otherwise, the pump will be back to its NFSD state for sleeping again if no flow is present in system.

1.2) No Flow Idle Detection Scheme

Similarly, no flow detection may be carried out continuously at a minimum speed in the pump's normal operation state. If a no flow in system condition is detected, then the pump may then be forced into the NFI state in which pump runs flow or no flow detection routines continuously. If a flow in system condition is detected, then the pump may then be sped up back to its normal operation. Otherwise, it will be remain in its NFI state until flow in system is detected.

1.3) No Flow Shutdown/Idle Detection Scheme with an External Flow Signal

An initial external flow signal, e.g., where the flow signal from a zone sensorless converter for a close loop hydronic system (see the reference labeled [7] below) or from a flow switch for a close loop or even an open loop hydronic booster system, may be introduced to make an initial detection of flow in system. After receiving the initial external flow signal, the control or controller may turn or switch the pump into the NFI state and carry out flow or no flow detection for further confirmation, if set. The pump may then sped back up to its normal operation, after the flow in system is confirmed at the NFI state. Otherwise, it will be turned or switched back to its NFSD state for sleeping.

According to some embodiments, the present invention may be implemented with flow switches having a magnetic switch or a photoresistor to detect pump shaft rotation movement to predict flow in system.

1.4) No Flow Shutdown/Idle Detection Scheme with an External Pressure Signal

An initial external pressure signal, e.g., where the pressure signal from a pressure sensor at pump suction for a close or open hydronic system, may be introduced as well to make an initial detection of flow in system by making use of the conventional pressure detection criterion. After the initial detection of a flow in system condition, the control or controller may turn or switch the pump into the NFI state and carry out flow or no flow detection for further confirmation, if requested. The pump may then be sped back up to its normal operation, after the flow in system condition is confirmed the NFI state. Otherwise, the pump will be back to its NFSD state for sleeping. The combination of a pump sensorless converter yielding the pump differential pressure and the external suction pressure sensor may make the energy saving control, e.g., see references labeled [3] to [7] feasible in an open-loop hydronic system.

2) No Flow Detection Criterions at Pump Minimum Speed

No flow detection criterions at motor minimum speed in pump normal operation state are the no flow conditions under which control may turn pump into the NFSD state or the NFI state, e.g. by following one of two NFSD/NSI schemes disclosed herein to save pump operation energy. Several no flow detection criterions at pump minimum speed for a sensorless pumping control are disclosed herein including the following:

2.1) System Flow

System flow at the pump minimum speed of $n_{min}$ may be taken as a no flow detection primary parameter under the no flow condition, based upon Eq. 2.1 as follows:

$$0 \leq Q^* \leq Q_{thr}, t \geq T_P. \quad (2.1)$$

Eq. 2.1 states that if the system flow rate $Q^*$ requested at the pump minimum speed is less than a flow threshold defined as $Q_{thr}$ for a period of prove time of $T_P$, the NFSD condition is met and a NFSD flag is then raised accordingly. Here, the system flow of $Q^*$ may be obtained directly from a sensorless converter or calculated as the requested flow rate by adaptive method.

2.2) System Pressure

System pressure at the pump minimum speed of $n_{min}$ may be taken as a no flow detection parameter as well under the condition exactly the same as the conventional NFSD pressure criterion for the no flow condition, based upon the Eq. 2.2 as follows:

$$(b_0 - db) \leq P^* \leq b_0, t \geq T_P. \quad (2.2)$$

Eq. 2.2 states that if the system pressure $P^*$ at the minimum speed is less than a minimum pressure of $b_0$ and greater than a pressure drop of $(b_0-db)$ from the minimum pressure for a period of prove time of $T_P$, then the NFSD condition is met and a NFSD flag is then raised accordingly. Here, the system pressure signal, $P^*$, may be obtained directly from a sensorless converter or calculated as the adaptive pressure set point by adaptive method.

2.3) System Coefficient

Similarly, the instant system coefficient at the pump minimum speed of $n_{min}$ may be taken as a no flow detection parameter as well under the no flow condition, based upon the Eq. 2.3 as follows:

$$0 \leq C^*_v \leq C_{v-thr}, t \geq T_P. \quad (2.3)$$

Eq. 2.3 states that if the instant system coefficient at the minimum speed is vanished or less than a system coefficient threshold of $C_{v-thr}$ for a period of prove time of $T_P$, then the NFSD condition is met and a NFSD flag is then raised accordingly. Here, the system coefficient, $C^*_v$, may be obtained directly from a sensorless converter or calculated by using the flow equation of $C^*_v = Q^*/\sqrt{P^*}$.

2.4) Motor Power, Current or Torque

Motor power at the pump minimum speed of $n_{min}$ may be taken as a no flow detection parameter directly under the no flow condition, based upon the Eq. 2.4 as follows:

$$0 \leq w^* \leq w_{thr}, t \geq T_P. \quad (2.4)$$

Eq. 2.4 states that if motor power of $w^*$ at the minimum speed is less than a power threshold of $w_{thr}$ for a period of prove time of $T_P$, the NFSD condition is met and a NFSD flag is then raised accordingly. Here, the motor power signal of w* may be obtained from the motor drive readouts directly.

Similarly, the other motor parameters such as motor current or torque from motor drive readouts may be taken as a no flow detection criterion as well as, based upon the Eqs. 2.5 or 2.6 as follows:

$$0 \leq A^* \leq A_{thr}, t \geq T_p \quad (2.5)$$

or $$0 \leq T^* \leq T_{thr}, t \geq T_p. \quad (2.6)$$

Here, the motor current and torque signal of A* and T* may be obtained from the motor drive readouts directly and $A_{thr}$ and $T_{thr}$ are their corresponding thresholds given.

3) No Flow Detection Criterions at Pump Idle Speed

No flow detection criterions at the motor idle speed in pump idle state are the no flow conditions under which the control or controller may turn pump back to its normal operation if flow is detected in system or back to NFSD state or NFI state otherwise, by following one of NFSD/NFI schemes disclosed herein to save pump operation energy. Several no flow criterions on pump idle state for a pump control with a sensorless pumping control are proposed in this work, including:

3.1) System Flow

System flow at the pump idle speed of $n_{idle}$ may be taken as a no flow detection primary parameter under the no flow condition, based upon Eq. 3.1 as follows:

$$0 \leq Q^* \leq Q_{thr}, t \geq T_p. \quad (3.1)$$

Eq. 3.1 states that if system flow Q* requested at pump idle speed is less than a flow threshold defined as $T_{thr}$ for a period of prove time of $T_P$, the NFSD condition is met and control may remain in the NFSD state or the NFI state, by following either one of NFSD/NSI schemes disclosed herein and NFSD flag remains raised. Otherwise, the control or controller will turn the pump back to its normal operation if flow is detected in system, i.e., $Q_{thr} \leq Q^*$ with $t \geq T_p$.

Again, the system flow rate signal of Q* may be obtained directly from a sensorless converter or calculated as the requested flow rate by adaptive method.

3.2) System Pressure

System pressure at the pump idle speed of $n_{idle}$ may be taken as a no flow detection parameter under the no flow condition, based upon the Eq. 3.2 as follows:

$$(H_0 - db) \leq P^* \leq H_0, t \geq T_p. \quad (3.2)$$

Eq. 3.2 states that if the system pressure P* at the idle speed is less than the idle pressure of $H_0$ and greater than a pressure drop of $(H_0 - db)$ from the idle pressure for a period of prove time of $T_P$, then the NFSD condition is met and control may remain in the NFSD state or the NFI state, by following either one of NFSD/NSI schemes disclosed herein and the NFSD flag remains raised. Otherwise, the control or controller will turn or switch the pump back to its normal operation if flow is detected in system under the flow condition, i.e., $P^* \leq (H_0 - db)$ with $t \geq T_p$. Here, the system pressure signal, P*, may be obtained directly from a sensorless converter or calculated as the adaptive pressure set point by an adaptive method.

3.3) System Coefficient

Similarly, the instant system coefficient at the pump idle speed of $n_{idle}$ may be taken as a no flow detection parameter as well under the no flow condition, based upon Eq. 3.3 as follows:

$$0 \leq C^*_v \leq C_{v-thr}, t \geq T_p. \quad (3.3)$$

Eq. 3.3 states that if the instant system coefficient at the minimum speed is vanished or less than a system coefficient threshold of $C_{v-thr}$ for a period of prove time of $T_P$, then the NFSD condition is met and the NFSD flag is then raised accordingly. Otherwise, the control or controller will turn or switch the pump back to its normal operation if flow is detected in system under the flow condition, i.e., $C_{v-thr} \leq C^*_v$ with $t \geq T_p$. Here, the system coefficient, $C^*_v$, may be obtained directly from a sensorless converter or calculated by using the flow equation of $C^*_v = Q^* / \sqrt{P^*}$.

3.4) Motor Power, Current or Torque

Motor power at the pump idle speed of $n_{idle}$ may be taken as a no flow detection parameter as well under the no flow condition, based upon the Eq. 3.4 as follows:

$$0 \leq w^* \leq w_{thr}, t \geq T_p. \quad (3.4)$$

Eq. 3.4 states that if motor power of w* at the idle speed is less than a power threshold of $w_{thr}$ for a period of prove time of $T_P$, then the NFSD condition is met and the NFSD flag is then raised accordingly. Otherwise, the control or controller will turn or switch the pump back to its normal operation if flow is detected in system under the flow condition, i.e., $w_{thr} \leq w^*$ with $t \geq T_p$. Again, the motor power signal of w* may be obtained from the motor drive readouts directly.

Similarly, the other motor parameters such as motor current or torque from motor drive readouts may be taken as a no flow detection criterion, based upon Eq. 3.5 or 3.6 as follows:

$$0 \leq A^* \leq A_{thr}, t \geq T_p, \quad (3.5)$$

or $$0 \leq T^* \leq T_{thr}, t \geq T_p, \quad (3.6)$$

Here, the motor current and torque signal of A* and T* may be obtained from the motor drive readouts directly.

The motor parameter no flow detection criterions in Eqs. 2.4-2.6 and 3.4-3.6 may provide an easy way to evaluate a no flow condition. They are, therefore, more preferable to be used for sensorless pumping control applications, if achievable from drive. On the other hand, the flow rate signal from a sensorless converter may yield a more direct indication on flow no flow presentation in system apparently. The corresponding criterions in Eqs. 2.1 and 3.1 may be preferable to be used as well. The same argument on the flow rate may be extended to the system coefficient criterions in Eqs. 2.3 and 3.3, accordingly. However, the pressure no flow conditions in Eqs. 2.2 and 3.2 may not be as sensitive as those for a conventional NFSD no flow condition with a pressure sensor, especially for a pump with slightly flat pump curve, since the pressure drop can be evaluated only along the pump curve with pump running at its idle speed for a sensorless application. Note that those no flow detection criterions disclosed herein may be used as an individual condition or as a combined condition for no flow detection in the NFSD and NFI states if needed. In addition with consideration of an open loop application with the flow detection scheme related to section 1.3 mentioned above, the control parameters, such as flow, power, and so forth, may be taken as the primary control variables accordingly. For that, the energy saving control algorithms disclosed in references labeled [3] to [7] may still be used effectively to save the pumping energy or power contributed by driving motors, based upon the flow rate derived by sensorless converter while disregarding the part of flow contribution, e.g., due to a municipality's (e.g., town, city or state) water supply pressure. In case that the flow contribution due to the municipality's water supply pressure may also need to be considered into energy saving control, however, the flow detection scheme related to section 1.4 can be introduced accordingly.

The pump differential pressure, flow rate converted from the Best Fit Affinity sensorless converter disclosed below, and their corresponding motor power measured with respect to pump idle speed of 15, 20, 25 and 30 Hz have been collected from a known centrifugal pump and are plotted in FIG. 4, respectively.

For the best fit affinity sensorless model data shown in FIG. 4, a flow rate of 5 GPM or its corresponding power value of 29 watts may be chosen as its no flow condition threshold at a given idle speed, say, 15 Hz. For that, no flow condition may then be determined by using Eq. 3.1 for flow, Eq. 3.4 for power, or other equations respectively. For a discrete sensorless converter, the data at a given idle speed may need to be provided or calculated first, so that the corresponding threshold may be determined to fulfill the NFI detection conditions accordingly.

Various Points of Novelty

The present invention may also include, or take the form of, one or more of the following various embodiments:

According to some embodiments, the present invention may include, or take the form of, implementations where the no flow shutdown or no flow idle detector means for sensorless pumping control includes a no flow detector with the no flow detection conditions and pump operations schemes proposed for sensorless pumping control applications to save pump operation energy when there is no flow request in system. Together with no flow shutdown (NFSD) conditions and operations at pump minimum speed in pump normal operation state, the introduction of a pump no flow idle state (NFI) with the additional no flow detection conditions at pump idle speed makes no flow shutdown or no flow idle pump operation feasible specifically for sensorless pumping control.

According to some embodiments, the present invention may include, or take the form of, implementations where the no flow detector means mentioned above includes a no flow shutdown and/or no flow idle scheme, having functionality like that schematically shown in FIG. 3, as follows. First, no flow detection may be carried out continuously at minimum speed in pump normal operation state. If no flow in the system is detected by the detector, then the pump may then be run into a NFSD state. After shut off for a period of time, e.g., defined as the pump off sleeping time of $T_s$ in the NFSD state, then control may turn pump into a NFI state and carry out no flow detection accordingly. If flow in system is detected, then pump may then be speeded up back to its normal operation. Otherwise, it will be back to its NFSD state for sleeping again.

According to some embodiments, the present invention may include, or take the form of, implementations where the no flow detector means mentioned above may include a no flow shutdown and/or no flow idle scheme, schematically shown in FIG. 3, as follows. Similarly, no flow detection may be carried out continuously at minimum speed in pump normal operation state. If no flow in system is detected, then pump may then be run into a NFI state. While running in NFI state, the no flow detection in system may be carried out continuously. If flow in the system is detected, the pump may then be speeded up back to its normal operation. Otherwise, it will remain in its NFI state until flow in system is detected.

According to some embodiments, the present invention may include, or take the form of, implementations where the no flow detector means mentioned above includes an external flow signal for sensorless NFSD applications as well. With use of an external flow signal, i.e., the flow signals from zones sensorless converters for a close loop hydronic system or from a physic flow switch for a close or open loop hydronic system, the flow in the secondary system may then be evaluated and detected as well. After received the external flow signal, the control may turn the secondary pump into a NFI state and carry out flow or no flow detection accordingly. Pump may then be speeded up back to its normal operation, after the flow in system is confirmed at NFI state. Otherwise, it will be back to its NFSD state for sleeping. By way of further example, a preferred version of flow switches may use a magnetic switch or a photoresistor switch to detect pump shaft rotation movement to predict initial flow status.

According to some embodiments, the present invention may include, or take the form of, implementations where the no flow detector means mentioned above includes an external pressure signal from a pressure sensor at pump suction section for sensorless NFSD applications as well. With use of an external pressure signal at pump suction for a close or open hydronic system, the conventional pressure detection criterion may be introduced to make an initial detection of flow in system. After flow in system detected, the control may turn pump into a NFI state and carry out flow or no flow detection for further confirmation, if requested. Pump is then speeded up back to its normal operation, after the flow in system is confirmed at NFI state. Otherwise, it will be back to its NFSD state for sleeping. The combination of a pump sensorless converter yielding the pump differential pressure and the external suction pressure sensor may make the energy saving control [3-7] feasible in an open-loop hydronic system.

According to some embodiments, the present invention may include, or take the form of, implementations where the no flow detection conditions and operations in the no flow detector means mentioned includes one or more of the combination of NFSD conditions and operations at the pump's minimum speed in the pump's normal operation state as proposed in Eqs. 2.1-2.6 above, to make or switch, or provide corresponding signaling to control or switch, the pump into either a NFSD state or a NFI state, after the conditions are met. Subsequently, the present invention may also include one or more of the combination of NFI detection conditions and operations as well in Eqs. 3.1-3.6 above, to make no flow detection at pump idle speed in its NFI state. Here, the corresponding no flow detection parameters may be pressure, flow rate, system position (system coefficient) as well as those of motor operation readouts, such as, power, current, or torque, and so forth. The motor parameters may be considered preferably, since they may be obtained more directly from a drive.

According to some embodiments, the present invention may include, or take the form of, implementations where the no flow detector means mentioned above is integrated with a sensorless converter specifically for sensorless pump control applications. It can be used in a hydronics pumping control applications with sensors as well, if so configured.

According to some embodiments, the present invention may include, or take the form of, implementations where the pumping hydronic system having the no flow detector means mentioned here include all close loop or open loop hydronic pumping systems now known or developed in the future, e.g., such as primary pumping systems, secondary pumping systems, water circulating systems, and pressure booster systems. The systems mentioned here may also include or consist of a single zone or multiple zones as well.

According to some embodiments, the present invention may include, or take the form of, implementation based upon transmitting control signals or signaling using wiring technologies, including all conventional sensing and transmitting means that are now known and used currently, as well as those developed in the future. It is envisioned that wireless signal transmission technologies may be optimal and favorable.

According to some embodiments, the present invention may include, or take the form of, implementations based upon using the pumps mentioned above for the hydronic pumping systems, e.g., including a single pump, a circulator, a group of parallel ganged pumps or circulators, a group of serial ganged pumps or circulators, or their combinations.

According to some embodiments, the present invention may include, or take the form of, implementations where the systems flow regulation may include manual or automatic control valves, manual or automatic control circulators, or their combinations.

Hydronic Characteristics and Discrete Distribution Functions

Techniques for determining a hydronic characteristics, and techniques for plotting distributions of such hydronic characteristics, e.g., like that shown in FIGS. 3-4, are also known in the art; and the scope of the invention is not intended to be limited to any particular type or kind thereof that is either now known or later developed in the future.

Moreover, one person skilled in the art would be able to implement the underlying invention without undue experimentation based upon that disclosed herein, including determining hydronic characteristics, and plotting distributions of such hydronic characteristics like that shown herein.

Other Related Applications

The application is related to other patent applications that form part of the overall family of technologies developed by one or more of the inventors herein, and disclosed in the following applications:

[1] U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014; and

[2] U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011, now abandoned;

[3] U.S. application Ser. No. 14/091,795, filed 27 Nov. 2013, entitled "3D sensorless conversion method and apparatus," which claims benefit to U.S. provisional application No. 61/771,375, filed 1 Mar. 2013, now abandoned;

[4] U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013, now abandoned;

[5] U.S. application Ser. No. 14/339,594, filed 24 Jul. 2014, entitled "Sensorless Adaptive Pump Control with Self-Calibration Apparatus for Hydronic Pumping System," which claims benefit to U.S. provisional application Ser. No. 14/339,594, filed 24 Jul. 2014, now abandoned;

[6] U.S. application Ser. No. 14/680,667, filed 7 Apr. 2015, entitled "A Best-fit affinity sensorless conversion means for pump differential pressure and flow monitoring," which claims benefit to provisional patent application Ser. No. 61/976,749, filed 8 Apr. 2014, now abandoned; and

[7] U.S. application Ser. No. 14/730,871, filed 4 Jun. 2015, entitled "System and flow adaptive sensorless pumping control apparatus energy saving pumping applications," which claims benefit to provisional patent application Ser. No. 62/007,474, filed 4 Jun. 2014, now abandoned; and

[8] U.S. application Ser. No. 14/969,723, filed 15 Dec. 2015, entitled "Discrete valves flow rate converter," which claims benefit to U.S. provisional application No. 62/091,965, filed 15 Dec. 2014; which are all assigned to the assignee of the instant patent application, and which are all incorporated by reference in their entirety.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:
1. Apparatus comprising:
a signal processor or processing module configured at least to:
receive signaling containing information about a pump no flow idle (NFI) state when the pump is running at a pump idle speed;
determine corresponding signaling containing information about whether the pump should remain in a no flow shutdown (NFSD) state or the NFI state, based upon the signaling received; and
provide control signaling to turn the pump OFF, based upon the corresponding signaling determined;
wherein the signal processor or processing module is configured to determine the corresponding signaling by taking a system flow $Q^*$ at a pump idle speed $n_{idle}$ as a no flow detection primary parameter under a no flow condition, using an equation:

$$0 \leq Q^* \leq Q_{thr}, t \geq T_p \qquad (3.1),$$

where a flow threshold is defined as $Q_{thr}$ for a period of prove time of $T_P$; and wherein the signal processor or processing module is configured to determine if the system flow $Q^*$ requested at the pump idle speed is less than the flow threshold $Q_{thr}$ for the period of prove time of $T_P$, and determine that if an NFSD condition is met and control may remain in the NFSD state or the NFI state, by following NFSD/NSI schemes and a NFSD flag remains raised; or otherwise, turn the pump back to its normal operation if flow is detected in system, based upon the Equation: $Q_{thr} \leq Q^*$ with $t \geq T_p$.

2. Apparatus according to claim 1, wherein the apparatus comprises the pump.

3. Apparatus according to claim 1, wherein the apparatus comprises one or more memory modules configured to store the signaling containing information about the pump no flow idle (NFI) state when the pump is running at the pump idle speed, and provide the signaling to the signal processor or processing module.

4. Apparatus comprising:
a signal processor or processing module configured at least to:
receive signaling containing information about a pump no flow idle (NFI) state when the pump is running at a pump idle speed; and
determine corresponding signaling containing information about whether the pump should remain in a no flow shutdown (NFSD) state or the NFI state, based upon the signaling received; and
provide control signaling to turn the pump OFF, based upon the corresponding signaling determined;
wherein the signal processor or processing module is configured to determine the corresponding signaling by taking system pressure $P^*$ at a pump idle speed $n_{idle}$ as a no flow detection parameter under the no flow condition, using an Equation:

$$(H_0 - db) \leq P^* \leq H_0, t \geq T_P \quad (3.2),$$

where $H_0$ is the idle pressure, $(H_0-db)$ is a pressure drop from the idle pressure, and $T_P$, is the period of prove time; and wherein the signal processor or processing module is configured to determine if the system pressure $P^*$ at the idle speed is less than the idle pressure $H_0$ and greater than the pressure drop $(H_0-db)$ from the idle pressure for the period of prove time of $T_P$, and determine if an NFSD condition is met and control may remain in the NFSD state or the NFI state, by following NFSD/NSI schemes and an NFSD flag remain raised; or otherwise, turn pump back to its normal operation if flow is detected in system under the flow condition, based upon the Equation: $P^* \leq (H_0-db)$ with $t \geq T_p$.

5. Apparatus comprising:
a signal processor or processing module configured at least to:
receive signaling containing information about a pump no flow idle (NFI) state when the pump is running at a pump idle speed; and
determine corresponding signaling containing information about whether the pump should remain in a no flow shutdown (NFSD) state or the NFI state, based upon the signaling received; and
provide control signaling to turn the pump OFF, based upon the corresponding signaling determined;
wherein the signal processor or processing module is configured to determine the corresponding signaling by taking an instant system coefficient $C_V$ at the pump idle speed of $n_{idle}$ as a no flow detection parameter as well under the no flow condition, using an Equation:

$$0 \leq C^*_V \leq C_{V-thr}, t \geq T_P \quad (3.3),$$

where $C_{V-thr}$ is a system coefficient threshold, and $T_P$ a period of prove time; and wherein the signal processor or processing module is configured to determine if the instant system coefficient $C_V$ at the minimum speed is vanished or less than the system coefficient threshold of $C_{V-thr}$ for the period of prove time of $T_P$, and determine if an NFSD condition is met and an NFSD flag is then raised accordingly; or otherwise, turn the pump back to its normal operation if flow is detected in system under the flow condition, using an Equation: $C_{V-thr} \leq C^*_V$ with $t \geq T_p$.

6. Apparatus comprising:
a signal processor or processing module configured at least to:
receive signaling containing information about a pump no flow idle (NFI) state when the pump is running at a pump idle speed; and
determine corresponding signaling containing information about whether the pump should remain in a no flow shutdown (NFSD) state or the NFI state, based upon the signaling received; and
provide control signaling to turn the pump OFF, based upon the corresponding signaling determined;
wherein the signal processor or processing module is configured to determine the corresponding signaling by taking motor power $w^*$ at the pump idle speed of $n_{idle}$ as a no flow detection parameter as well under the no flow condition, using an Equation:

$$0 \leq w^* \leq w_{thr}, t \geq T_p \quad (3.4),$$

where $w^*$ is the motor power, $w_{thr}$ is a power threshold of $w_{thr}$, and $T_P$ is a period of prove time; and wherein the signal processor or processing module is configured to determine if the motor power $w^*$ at the idle speed is less than the power threshold $w_{thr}$ for the period of prove time $T_P$, and determine if an NFSD condition is met and a NFSD flag is then raised accordingly; or otherwise, turn pump back to its normal operation if flow is detected in system under the flow condition, based upon an Equation: $w_{thr} \leq w^*$ with $t \geq T_p$.

7. A method comprising:
receiving with a signal processor or processing module signaling containing information about a pump no flow idle state (NFI) when the pump is running at a pump idle speed;
determining with the signal processor or processing module corresponding signaling containing information about whether the pump should remain in a no flow shutdown (NFSD) state or the NFI state, based upon the signaling received; and
providing control signaling to turn the pump OFF, based upon the corresponding signaling determined;
wherein the method comprises configuring the signal processor or processing module to determine the corresponding signaling by taking a system flow $Q^*$ at a pump idle speed $n_{idle}$ as a no flow detection primary parameter under a no flow condition, using an equation:

$$0 \leq Q^* \leq Q_{thr}, t \geq T_P \quad (3.1),$$

where a flow threshold is defined as $Q_{thr}$ for a period of prove time of $T_P$; and wherein the method comprises configuring the signal processor or processing module to determine if the system flow Q* requested at the pump idle speed is less than the flow threshold $Q_{thr}$ for the period of prove time of $T_P$, and determine that if an NFSD condition is met and control may remain in the NFSD state or the NFI state, by following NFSD/NSI schemes and a NFSD flag remains raised; or otherwise, turn the pump back to its normal operation if flow is detected in system, based upon the Equation: $Q_{thr} \leq Q^*$ with $t \geq T_p$.

8. A method according to claim 7, wherein the method comprises configuring the signal processor or processing module as part of the pump.

9. A method according to claim 7, wherein the method comprises configuring one or more memory modules to store the signaling containing information about the pump no flow idle (NFI) state when the pump is running at the pump idle speed, and to provide the signaling to the signal processor or processing module.

10. A method comprising:
receiving with a signal processor or processing module signaling containing information about a pump no flow idle state (NFI) when the pump is running at a pump idle speed;
determining with the signal processor or processing module corresponding signaling containing information about whether the pump should remain in a no flow shutdown (NFSD) state or the NFI state, based upon the signaling received; and
providing control signaling to turn the pump OFF, based upon the corresponding signaling determined;
wherein the method comprises configuring the signal processor or processing module to determine the corresponding signaling by taking system pressure P* at a pump idle speed $n_{idle}$ as a no flow detection parameter under the no flow condition, using an Equation:

$$(H_0-db) \leq P^* \leq H_0, t \geq T_p \qquad (3.2),$$

where $H_0$ is the idle pressure, ($H_0$–db) is a pressure drop from the idle pressure, and $T_P$, is the period of prove time; and
wherein the method comprises configuring the signal processor or processing module to determine if the system pressure P* at the idle speed is less than the idle pressure $H_0$ and greater than the pressure drop ($H_0$–db) from the idle pressure for the period of prove time of $T_P$, and determine if an NFSD condition is met and control may remain in the NFSD state or the NFI state, by following NFSD/NSI schemes and an NFSD flag remain raised; or otherwise, turn pump back to its normal operation if flow is detected in system under the flow condition, based upon the Equation: $P^* \leq (H_0-db)$ with $t \geq T_p$.

11. A method comprising:
receiving with a signal processor or processing module signaling containing information about a pump no flow idle state (NFI) when the pump is running at a pump idle speed;
determining with the signal processor or processing module corresponding signaling containing information about whether the pump should remain in a no flow shutdown (NFSD) state or the NFI state, based upon the signaling received; and
providing control signaling to turn the pump OFF, based upon the corresponding signaling determined;
wherein the method comprises configuring the signal processor or processing module to determine the corresponding signaling by taking an instant system coefficient $C_V$ at the pump idle speed of $n_{idle}$ as a no flow detection parameter as well under the no flow condition, using an Equation:

$$0 \leq C^*_V \leq C_{v-thr}, t \geq T_p \qquad (3.3),$$

where $C_{v-thr}$ is a system coefficient threshold, and $T_P$ a period of prove time; and
wherein the method comprises configuring the signal processor or processing module to determine if the instant system coefficient $C_V$ at the minimum speed is vanished or less than the system coefficient threshold of $C_{v-thr}$ for the period of prove time of $T_P$, and determine if an NFSD condition is met and an NFSD flag is then raised accordingly; or otherwise, turn the pump back to its normal operation if flow is detected in system under the flow condition, using an Equation: $C_{v-thr} \leq C^*_V$ with $t \geq T_p$.

12. A method comprising:
receiving with a signal processor or processing module signaling containing information about a pump no flow idle state (NFI) when the pump is running at a pump idle speed;
determining with the signal processor or processing module corresponding signaling containing information about whether the pump should remain in a no flow shutdown (NFSD) state or the NFI state, based upon the signaling received; and
providing control signaling to turn the pump OFF, based upon the corresponding signaling determined;
wherein the method comprises configuring the signal processor or processing module to determine the corresponding signaling by taking motor power w* at the pump idle speed of $n_{idle}$ as a no flow detection parameter as well under the no flow condition, using an Equation:

$$0 \leq w^* \leq w_{thr}, t \geq T_p \qquad (3.4),$$

where w* is the motor power, $w_{thr}$ is a power threshold of $w_{thr}$, and $T_P$ is a period of prove time; and
wherein the method comprises configuring the signal processor or processing module to determine if the motor power w* at the idle speed is less than the power threshold $w_{thr}$ for the period of prove time $T_P$, and determine if an NFSD condition is met and a NFSD flag is then raised accordingly; or otherwise, turn pump back to its normal operation if flow is detected in system under the flow condition, based upon an Equation: $w_{thr} \leq w^*$ with $t \geq T_p$.

* * * * *